P. BARDUCCI.
ARRANGEMENT FOR CHANGING AND HEATING AIR IN ROOMS AND CHAMBERS OF ANY KIND.
APPLICATION FILED JAN. 19, 1920.

INVENTOR:
PILADE BARDUCCI

P. BARDUCCI.
ARRANGEMENT FOR CHANGING AND HEATING AIR IN ROOMS AND CHAMBERS OF ANY KIND.
APPLICATION FILED JAN. 19, 1920.
1,395,938.
Patented Nov. 1, 1921.
7 SHEETS—SHEET 2.
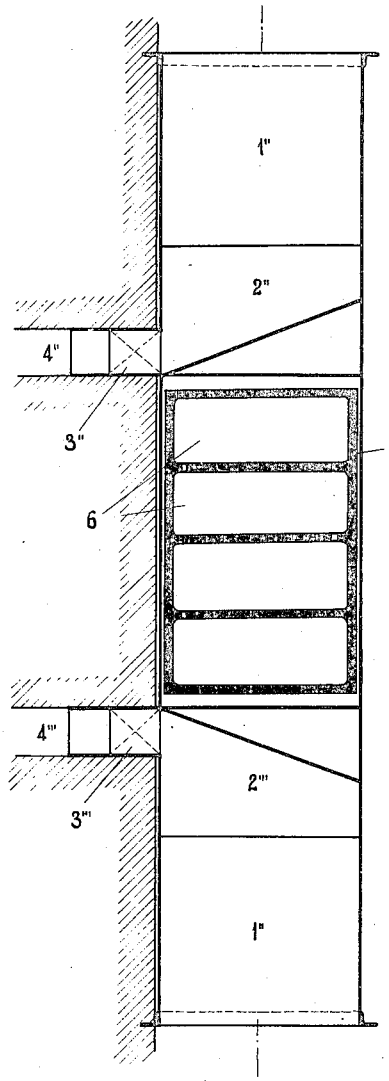
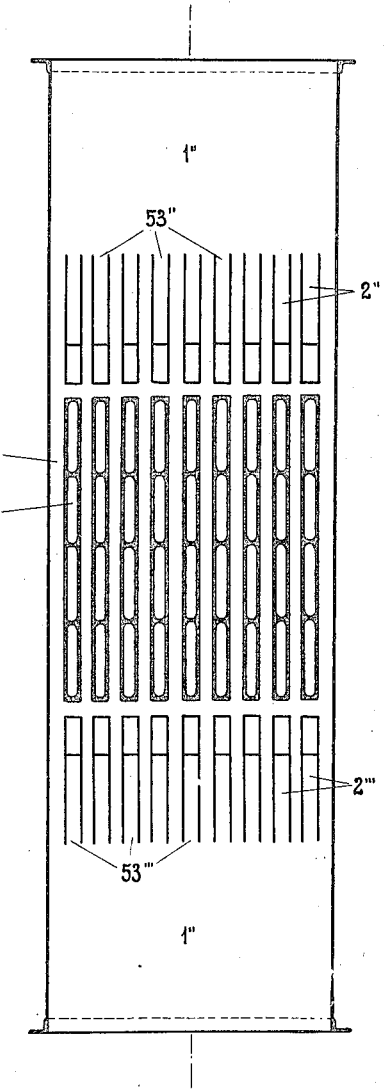

P. BARDUCCI.
ARRANGEMENT FOR CHANGING AND HEATING AIR IN ROOMS AND CHAMBERS OF ANY KIND.
APPLICATION FILED JAN. 19, 1920.
1,395,938.
Patented Nov. 1, 1921.
7 SHEETS—SHEET 3.
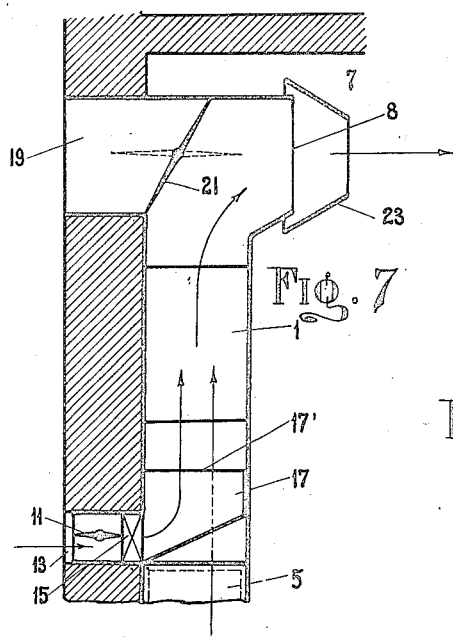
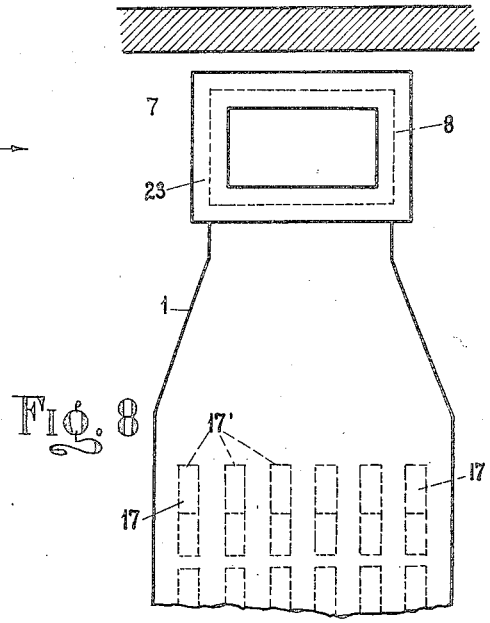
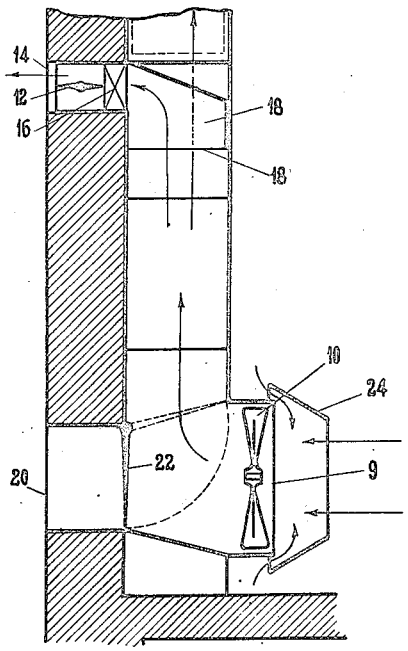
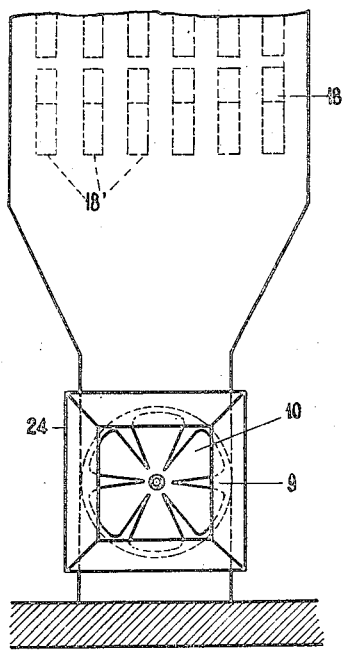
INVENTOR:
PILADE BARDUCCI

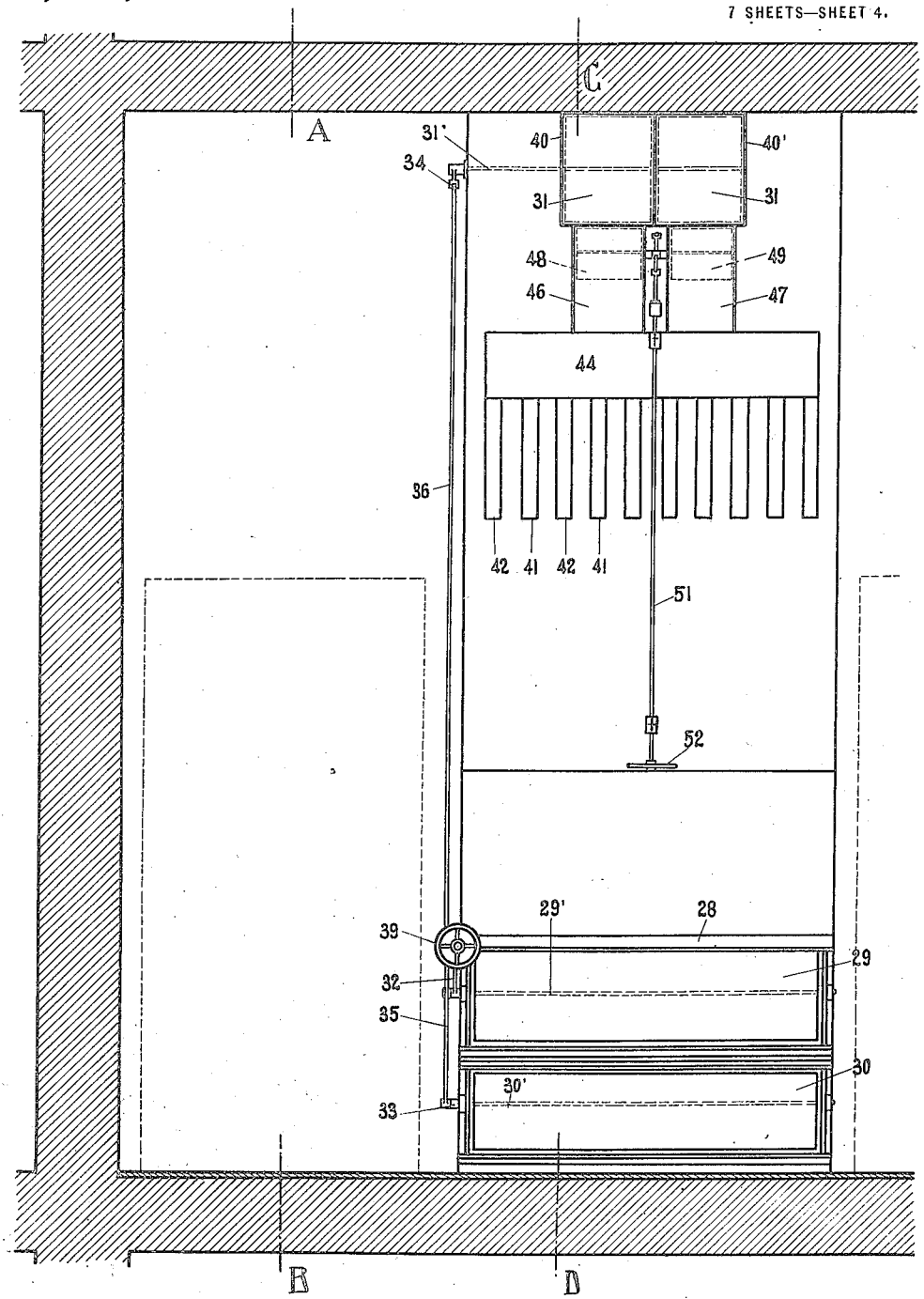

P. BARDUCCI.
ARRANGEMENT FOR CHANGING AND HEATING AIR IN ROOMS AND CHAMBERS OF ANY KIND.
APPLICATION FILED JAN. 19, 1920.

1,395,938.

Patented Nov. 1, 1921.
7 SHEETS—SHEET 6.

INVENTOR:
PILADE BARDUCCI
By Lawrence Langner
Attorney.

UNITED STATES PATENT OFFICE.

PILADE BARDUCCI, OF NAPLES, ITALY.

ARRANGEMENT FOR CHANGING AND HEATING AIR IN ROOMS AND CHAMBERS OF ANY KIND.

1,395,938. Specification of Letters Patent. Patented Nov. 1, 1921.

Application filed January 19, 1920. Serial No. 352,267.

*To all whom it may concern:*

Be it known that I, PILADE BARDUCCI, a subject of the King of Italy, and resident of Naples, Italy, have invented certain new and useful Improvements in Arrangements for Changing and Heating Air in Rooms and Chambers of Any Kind, of which the following is a specification.

This invention has for its object a system for changing and, if required, heating air in rooms and chambers of any kind.

The apparatus according to this invention is particularly useful for preventing the production of fog, mist or vapors in factories of various kinds, for instance, in dyeing works, silk spinning works, paper mills, chemical works and the like, as well as for the ventilation of drying plants, said apparatus permitting the air circulation within the works to be modified according to requirements.

Figure 1:
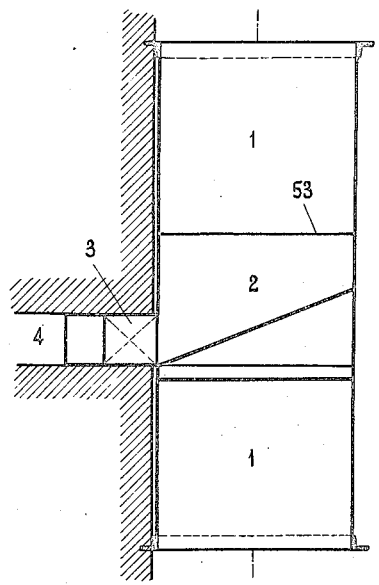
Figure 2:
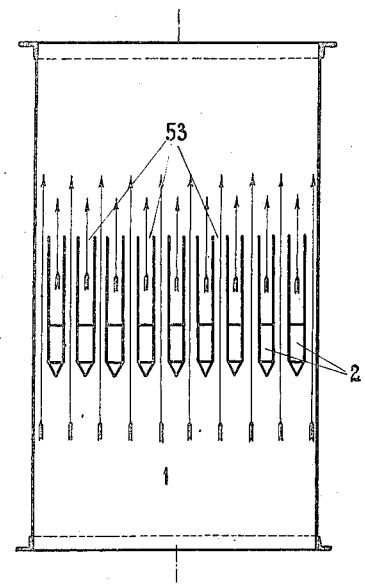
Figure 3:
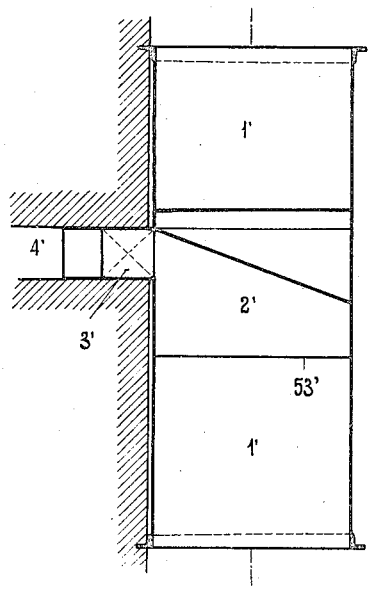
Figure 4:
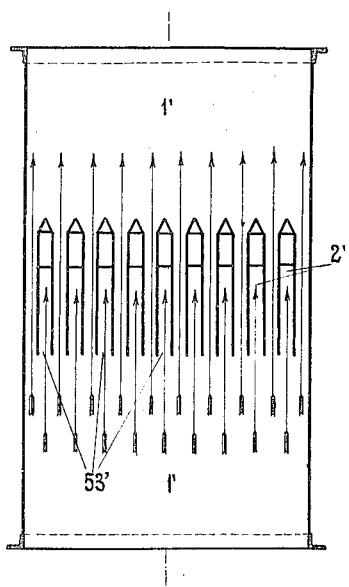
Figure 10:
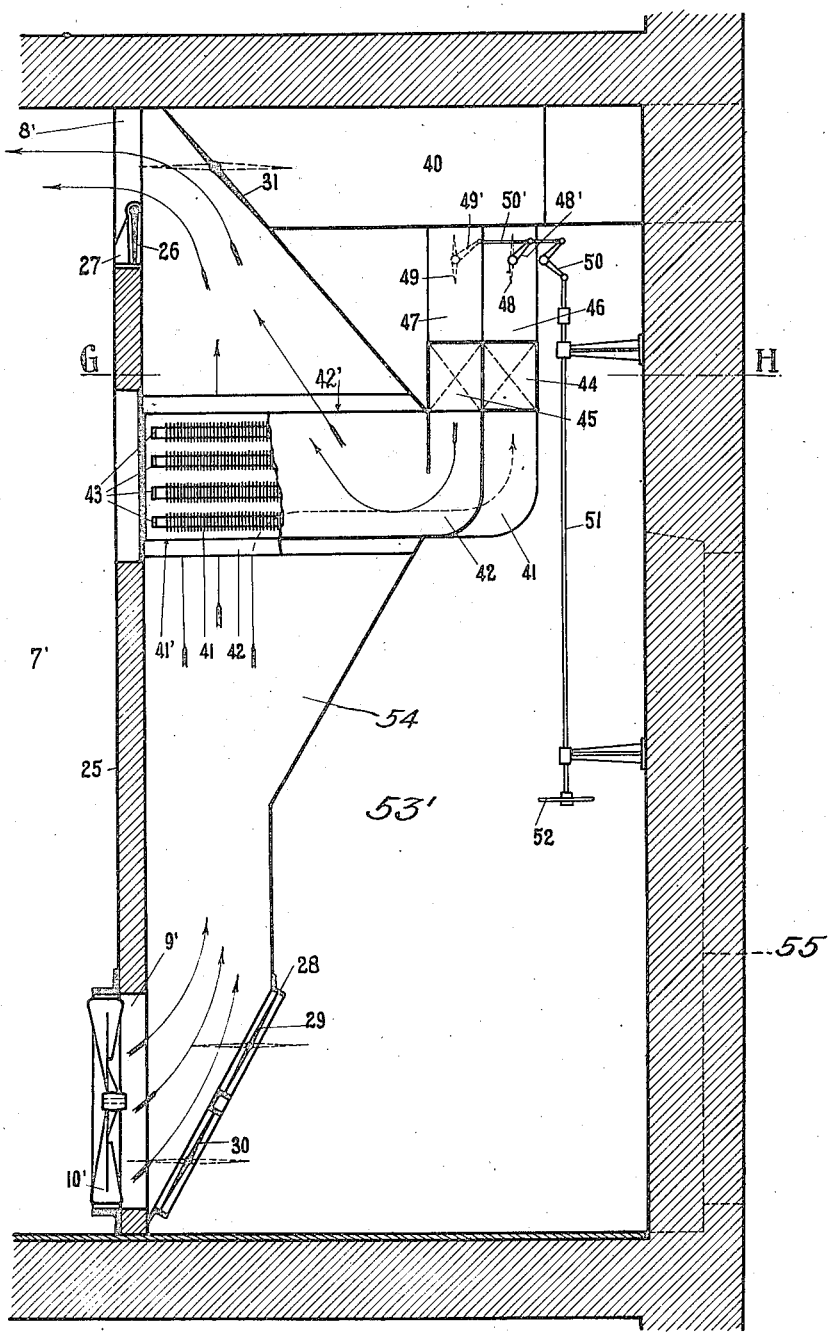
Figure 11:
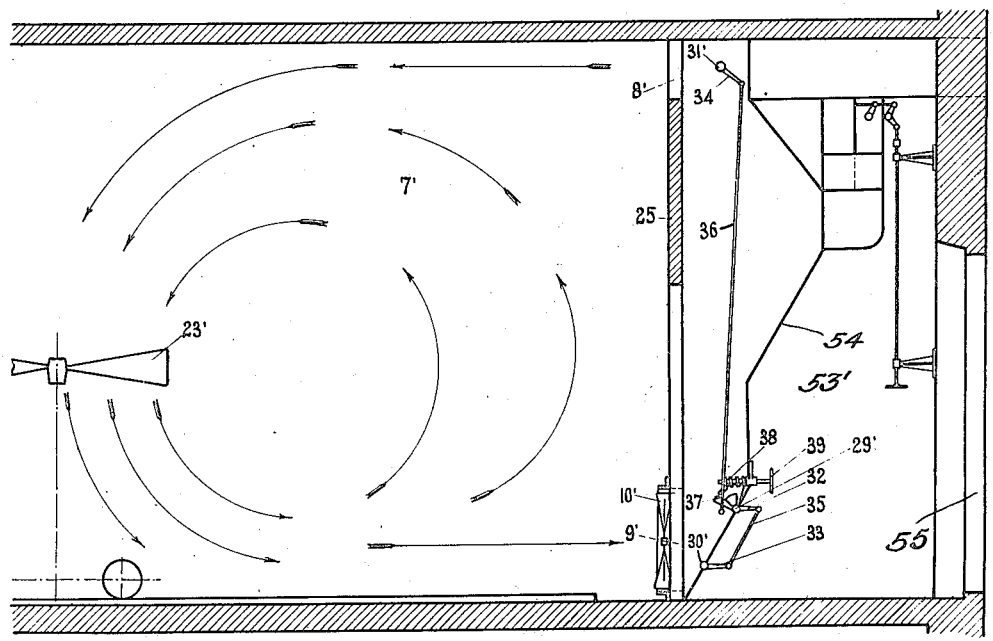
Figure 13:
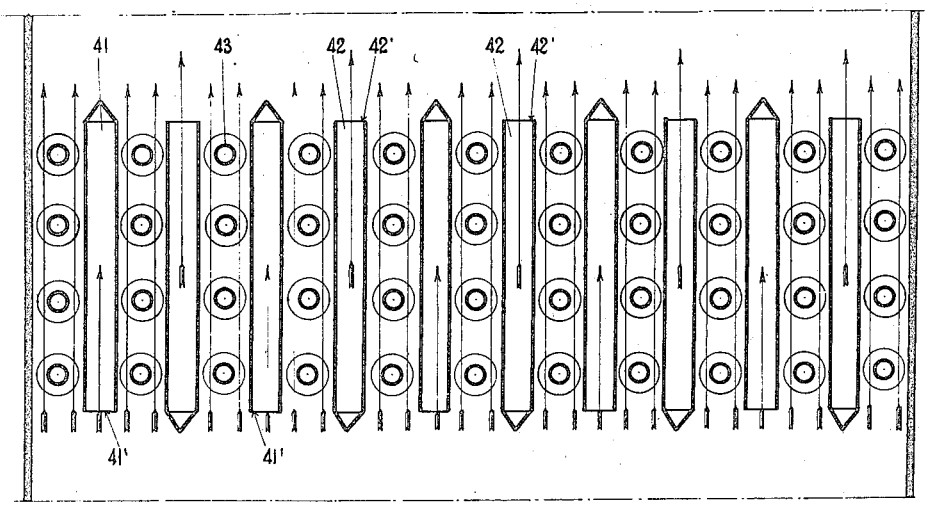
Figure 12:
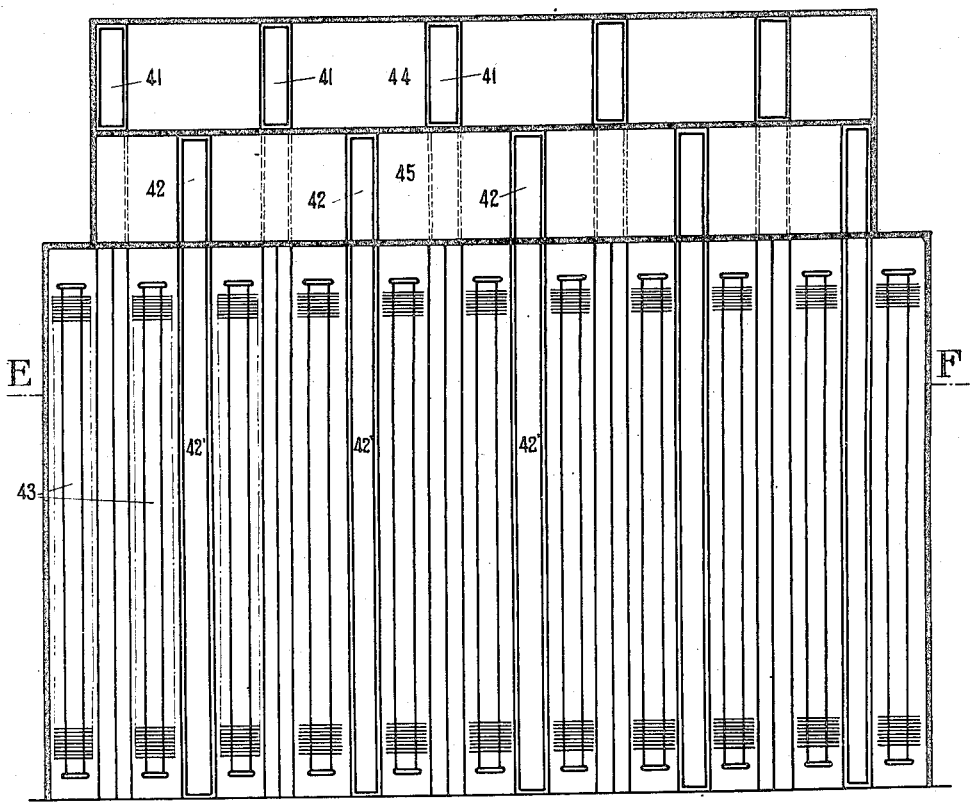

The annexed drawings show by way of example some embodiments of this invention; Figures 1 and 2 are transverse and longitudinal sections, respectively, of an apparatus intended to supply air from the outside and mix the same with air circulating within the plant; Figs. 3 and 4 are transverse and longitudinal sections, respectively, of an apparatus for exhausting to the outside a portion of the air circulating within the plant; Figs. 5 and 6 are sections taken along vertical planes perpendicular to each other of an apparatus which may be used to produce either an air supply within the room or plant or the exhaust of air therefrom, or both said operations at the same time; Fig. 7 is a vertical section and Fig. 8 is a front elevation of a modified construction; Figs. 9 and 10 are a front view and a section on line C—D, Fig. 9, respectively, of an apparatus according to this invention the same being mounted outside of a drying chamber; Fig. 11 shows, on a reduced scale, a longitudinal section of said drying chamber taken on line A—B, Fig. 9; Fig. 12 is a horizontal section on an enlarged scale of said casing taken on line G—H, Fig. 10, and Fig. 13 is a vertical section of the same on line E—F, Fig. 12.

The apparatus shown by Figs. 1 and 2 comprises a casing 1 providing a passage in which are mounted a number of boxes 2 which open into a duct 3 leading to the outside through a passage 4, said boxes being arranged side by side and leaving a free intermediate space between each other. All said boxes 2 are provided with mouths 53 opening in the direction of the air flow through casing 1; the air current flowing through the latter being thus divided into a number of streams passing through the interstices between adjacent boxes 2 and producing a suction through said mouths so as to cause air to enter from outside through passage 4 and duct 3 into boxes 2 and casing 1 and to be mixed with air flowing through said casing.

Figs. 3 and 4 illustrate a construction comprising a casing 1' in which are mounted adjacent boxes 2' leaving free intermediate spaces. Said boxes open into a duct 3' communicating with the outside through passage 4' and are provided with mouths 53' opening opposite the flow of air through casing 1', the air current being thus divided into a plurality of streams, certain of which pass through the spaces between adjacent boxes while others enter said boxes. A portion of air is thus discharged to the outside through said boxes 2', duct 3' and passage 4'.

The shape of boxes 2 and 2' illustrated on the drawing is the preferred one but the boxes may have any other shape—for example, they may have a circular shape—or may consist of tubes or the like; also casings 1 and 1' may have any other required shape as a circular one, and boxes 2—2' may be arranged therein in any preferred manner—say, radially—the same leading to collectors arranged either at the center or at the periphery of said casings.

Within casings 1 and 1' may be located heating means of any kind as well as means for propelling air therethrough; these means are not shown in Figs. 1–4, but they are well known to men skilled in the art, and some constructions of the same are hereinafter described and illustrated in other figures of the drawings.

Said casing 1 or 1' may be mounted within rooms, cells or chambers of any kind for causing the air circulating therethrough to be mixed with fresh air drawn from the outside or for exhausting a portion of said air.

Said casings may also be mounted outside of the room, the same having their orifices connected with the room or the like.

Figs. 5 and 6 illustrate a construction of apparatus comprising a casing 1″ having therein two sets of boxes 2″ and 2‴ of the above described kind, said boxes communicating with the outside through ducts 3″ and 3‴ and passages 4″—4‴ respectively.

As shown in said figures the boxes of one of said sets—say 2″—have their mouths 53″ opening into casing 1″ in the direction of the air current flowing through the same for the purpose of drawing air into said casing from the outside; the mouths 53‴ of the boxes of the other set 2‴ open opposite to said current to discharge to the outside a portion of the air driven through said casing 1″.

Between the sets of boxes 2″ and 2‴ are arranged heating means comprising flat boxes 5 arranged side by side and spaced apart from each other, said boxes 5 having therein partitions forming a number of spaces 6 in which a hot fluid is caused to circulate. The number and size of said heating boxes 5 are preferably such as to leave therebetween the same free spaces left between adjacent boxes 2″ and 2‴; the casing 1″ and coöperating parts may be arranged in any preferred manner within the room or chamber—say, the same may be horizontal or vertical according to circumstances.

Moreover, the direction of flow of the air current through said casing may be reversed with regard to that shown on the drawing, and in any case the advantage is obtained that the portion of air to be discharged is exhausted before coming in contact with the heating means, and that the fresh air and heated air are supplied to the room in a number of adjacent and alternating streams so that they are fully mixed together.

Propelling means of any kind may be used to drive air through said casing, but when the latter is arranged vertically the propelling means may be omitted, air being moved by the heat issuing from the heating means and causing the air to rise through the casing.

The apparatus shown by Figs. 7 and 8 is similar to that described in connection with Figs. 5 and 6; and it is assumed to be mounted within a room 7 having a considerable height and located adjacent the wall of the same.

Said apparatus comprises a vertical casing 1 having two mouths 8 and 9 one of which, and preferably the lower one, is provided with a reversible propeller 10 adapted to draw air into the casing from near the floor of the room (or at any other point) and to force it into the room through the upper mouth, the air being caused to flow between changing and heating devices; but said propeller may also draw in air from near the roof of the room (or at any other point) and force said air through the lower mouth into the room, since the direction of the air current may obviously be reversed by reversing the operation of the propeller.

As hereinbefore described, within said casing 1 are provided two sets of boxes 17 and 18 having mouths 17′—18′ opening toward the adjacent mouths 8 and 9, respectively, and said boxes 17 and 18 communicate with ducts 15—16 and passages 13—14, respectively, leading to the outside.

Valves 11 and 12, respectively, are mounted in each of said passages 13 and 14, and the same are intended to control the flow of air through said passages.

Heating means 5 are located in said casing 1 between said sets of boxes 17 and 18 as above described, the same providing a number of passages between each other for the flow of air through said casing.

Opposite mouths 8 and 9 the wall of room 7 is provided with orifices 19 and 20 which are controlled by means of valves 21 and 22 respectively. This arrangement is intended to allow of fully changing the air within the room, as when said valves 21 and 22 are carried into the positions shown by dotted lines, valve 22 clears orifice 20 and cuts off the communication between mouth 9 and casing 1, the air propelled by propeller 10 being thus exhausted to the outside; on the other hand valve 21 when moved into dotted-line position, clears orifice 19 and thereby air is allowed to enter the room.

In case the air current must be driven a considerable distance within the room, truncated conical or pyramidal frames or hoppers 23 and 24 are preferably located in front of mouths 8 and 9 with their larger mouths in register and spaced apart from the same, said hoppers being intended to impart a higher speed to the air exhausted through either of said mouths 8 and 9 without affecting the suction through these mouths when the same operate as suction ones. This is shown by arrows in connection with mouth 9 and hopper 24, Fig. 7.

Figs. 9, 10, 12 and 13 show an embodiment of the invention which is substantially similar to that shown by Figs. 7 and 8, and Fig. 11 shows the same in coöperation with a traveling fan 23′ moving forward and backward in the room and acting to stir the air therein.

In this embodiment, at the end of the room 7′ is arranged a partition 25 providing therein a chamber 53′, said partition having mouths 8′ and 9′, the latter of which is provided with a propeller 10′. Mouth 8′ is provided with a pivotally depending baffle 26 which is allowed to move toward chamber 53′ but is prevented from moving toward room 7′ by means of suitable stop pieces 27.

With this arrangement the full area of mouth 8′ is cleared when air is drawn through the same from room 7′ into chamber 53', and on the contrary a restricted orifice is provided therein when air is forced through it into room 7', thus increasing the speed of the air current.

Within said chamber 53' is provided a casing 54 into which open mouths 8' and 9', said casing having, in front of mouth 9', a frame 28 in which are mounted valves 29 and 30. As shown by Fig. 10, the frame 28 is preferably inclined with regard to the axis of propeller 10' and mouth 9' so as to deflect the air drawn in by the same and to cause it to rise within casing 54.

The upper portion of casing 54 is also provided with an inclined wall having two orifices arranged side by side and controlled by two valves 31 mounted on the same shaft 31' (Fig. 9).

Said valves 29, 30 and 31 are controlled at the same time by means of an arrangement located outside of the casing and comprising levers 32—33—34 fixed to shafts 29'—30'—31' of valves 29, 30, 31; said levers are connected by means of rods 35 and 36, and one of said shafts—say, shaft 29' of valve 29—is provided with a toothed quadrant 37 meshing with a worm wheel 38 operated by a hand wheel 39 (see Figs. 9-10 and the right end of Fig. 11).

The two mouths controlled by valves 31 lead to ducts 40—40' respectively, each duct comprising portions parallel with each other and diverging portions for the purpose of opening at the outside at a certain distance from each other.

Both ducts 40—40' operate to supply air from the outside into the room 7' when casing 54 is put out of operation; on the contrary when the apparatus inclosed in said casing is in operation, one of said ducts exhausts air from room 7' to the outside while the other one supplies air from the outside into room 7' as hereinafter described. Therefore it is advisable that the outer mouths of said ducts open at a proper distance from each other to prevent the air to be supplied into the room from becoming mixed with that exhausted therefrom.

For putting the apparatus inclosed in casing 54 out of operation, the hand wheel 39 is operated to carry said valves 29—30—31 into the positions shown by dotted lines in Fig. 10; thus the mouth 8' is caused to communicate with ducts 40—40' leading to the outside and mouth 9' communicates with the orifices of frame 28.

It is thus possible, when required, to obtain an intense ventilating action within room 7' without heating the air supplied thereto, as such ventilation is effected through ducts 40—40' and mouth 8' under the action of propeller 10', which, when the valves 29—30 are open, drives the air into chamber 53', said chamber leading to the outside through a passage 55 (see Fig. 11).

Propeller 10' may also be operated so as to drive air into room 7', the air being in this case exhausted through mouth 8' and ducts 40—40'.

On the contrary when it is desired to carry into operation the apparatus inclosed within casing 54, said valves 29—30—31 are closed; then the air drawn through mouth 9' rises in casing 54 in which it is heated and mixed with fresh air, and the mixture is driven into room 7' through mouth 8'.

The apparatus for heating and changing air within casing 54 is hereinafter described. Said apparatus comprises two sets of boxes 41 and 42 arranged at the side of and spaced apart from each other, each box 41 being located between two adjacent boxes 42 (Fig. 9); and boxes 41 are provided with mouths 41' opening in said casing toward mouth 9', while boxes 42 are provided with mouths 42' opening toward mouth 8'.

In the intermediate spaces between adjacent boxes 41 and 42 are located heating means as wing pipes 43 in which a hot fluid is caused to circulate.

Boxes 41 lead to a collector 44 and boxes 42 to a collector 45, said collectors leading in turn to passages 46 and 47 which open into ducts 40 and 40' respectively; said passages 46 and 47 are provided with controlling valves 48—49 operated by means of levers 48'—49', rod 50', bell crank lever 50, rod 51 and handle 52.

During the operation, a portion of the air current rising through casing 54 under the action of propeller 10' enters the boxes 41 having their mouths 41' opening toward said propeller, and such air is therefore discharged through passages 44—46—40. The other portion of air flows between adjacent boxes 41—42 and heating pipes 43 and is thus heated and produces a suction at the mouths of boxes 42 so as to draw fresh air from outside through boxes 42 and passages 45—47—40'; this fresh air is mixed with heated air and the mixture is fed into room 7' through mouth 8'.

On reversing the rotation of propeller 10', boxes 41 act as suction means and boxes 42 as exhaust means.

Obviously casing 54 may be located in any other position than that illustrated, for instance, horizontally; the arrangement above described may also be used in connection with a plurality of rooms, mouths 8' and 9' being in this case provided with ducts leading to the several rooms.

The apparatus according to this invention may also be used in plants comprising ventilating means operating in room 7', said means acting to propel air through mouths 8'—9' or assisting the operation of the propeller 10' arranged at one of said mouths. Such a construction is shown by way of example by Fig. 11 in which a fan or propeller 23' is mounted to travel within room 7', the same producing air currents directed toward mouths 8' and 9'.

In connection with subject matter disclosed but not claimed herein attention is called to my copending applications Serial Nos. 317,900 filed August 16, 1919, 352,263 filed January 19, 1920, and 352,266 filed January 19, 1920, and my Patent No. 1,344,163 granted June 22, 1920.

I claim as my invention:—

1. An apparatus for changing air in rooms of any kind, comprising a casing having orifices opening into the room, means for producing an air current through said casing and orifices, flat boxes in said casing arranged adjacent to each other and leaving intermediate spaces for the air flow through the casing, and heating means between said boxes, said boxes having mouths opening into said casing and communicating with the outside, said air current and mouths coöperating to produce an air flow through said boxes.

2. An apparatus for changing air in rooms of any kind, comprising a casing having inlet and exhaust orifices opening into the room and spaced apart from each other, two sets of boxes in said casing, the boxes of each set having mouths opening into the casing toward one orifice, all said boxes leading to the outside, and means for producing an air current through said casing and orifices, the boxes which open toward the inlet orifice discharging a portion of the air into the outside, and the other ones drawing fresh air from the outside into the casing.

3. An apparatus for changing air in rooms of any kind, comprising a casing having inlet and exhaust orifices opening into the room and spaced apart from each other, two sets of boxes in said casing, the boxes of each set having mouths opening into the casing toward one orifice, all said boxes leading to the outside, means for producing an air current through said casing and orifices, and heating means between said boxes, the boxes which open toward the inlet orifice discharging a portion of the air into the outside, and the other ones drawing fresh air from the outside into the casing.

4. An apparatus for changing air in rooms of any kind, comprising a casing having inlet and exhaust orifices opening into the room, means for producing an air current through said casing and orifices, two sets of flat boxes in said casing, said boxes being arranged adjacent to each other and leaving intermediate spaces for the air flow through said casing, the boxes of each set having mouths opening into said casing toward the adjacent orifice thereof and communicating with the outside, said air current and the boxes which open toward the inlet orifice coöperating to discharge a portion of the air to the outside, and the said air current and the other boxes coöperating to draw air from the outside and to mix it with the air flowing through said intermediate spaces.

5. An apparatus for changing air in rooms of any kind, comprising a casing having orifices opening into said room at different levels, two sets of elements in said casing each having mouths opening toward the adjacent orifices of said casing, all said elements leading to the outside, heating means located in said casing between said sets of elements, said means heating the air and causing it to move vertically in said casing, the mouths of said elements which open toward the lower orifice of said casing discharging a portion of said air to the outside, and the other ones drawing fresh air from the outside into said casing and mixing it with the heated air.

6. An apparatus for changing air in rooms of any kind, comprising a casing having orifices opening into the room, means for producing an air current through said casing and orifices, and flat boxes in said casing arranged adjacent to each other and leaving intermediate spaces for the air flow through the casing, said boxes having mouths opening into said casing and communicating with the outside, said air current and mouths coöperating to produce an air flow through said boxes.

7. An apparatus for changing air in rooms of any kind, comprising a casing having inlet and exhaust orifices opening into the room, means for producing an air current through said casing and orifices, two sets of flat boxes in said casing, said boxes being arranged adjacent to each other and leaving intermediate spaces for the air flow through said casing, the boxes of each set having mouths opening into said casing toward the adjacent orifice thereof and communicating with the outside, and heating means between said sets of boxes, said air current and the boxes which open toward said inlet orifice coöperating to discharge a portion of the air to the outside, and the said air current and the other boxes coöperating to draw air from the outside and to mix it with the air heated by said heating means.

8. An apparatus for changing air in rooms of any kind, comprising a casing having inlet and exhaust orifices opening into the room and spaced apart from each other vertically, two sets of flat boxes in said casing, said boxes being arranged adjacent to each other and leaving intermediate spaces for the air flow through said casing, the boxes of each set having mouths opening into said casing toward the adjacent orifice thereof and communicating with the outside, and flattened heating means between said sets of boxes, said heating means being in register with said boxes to leave intermediate spaces and to cause the air to rise in said casing, the boxes which open toward said inlet orifice discharging a portion of the air to the outside, and the other boxes drawing air from the outside and mixing it with the air heated by said heating means.

9. An apparatus for changing air in rooms of any kind, comprising a casing having inlet and exhaust orifices opening into the room, means for producing an air current through said casing and orifices, two sets of flat boxes in said casing, the boxes of each set being arranged intermediate the boxes of the other one and leaving free intermediate passages therebetween, the boxes of one set having mouths opening into said casing toward the inlet orifice, and the boxes of the other set having mouths opening toward the exhaust orifice, all said boxes leading to the outside, and heating means in said intermediate passages, the boxes of the first set exhausting a portion of the air flowing through said casing, and the boxes of the second set drawing air from the outside into said casing and mixing it with the air heated by said heating means.

10. An apparatus for changing air in rooms of any kind, comprising a casing having orifices opening into the room, reversible propelling means at one of said orifices for producing an air current through said casing and orifices, two sets of boxes in said casing, said boxes being spaced apart from each other and having mouths opening into the casing toward one of its orifices, all said boxes leading to passages communicating with the outside, controlling means in said passages, the boxes of one set exhausting air to the outside, and the boxes of the other set drawing air from the outside into said casing, and heating means in said casing intermediate said boxes, said casing having ports provided at points beyond the space between the boxes and leading to the outside, and also having valves controlling said ports.

Signed at Naples, Italy, this 8th day of December, A. D. 1919.

PILADE BARDUCCI.